United States Patent
Steigleder et al.

[15] 3,696,671
[45] Oct. 10, 1972

[54] AIRCRAFT HORIZONTAL SITUATION NAVIGATION DISPLAY SYSTEM

[72] Inventors: Charles J. Steigleder, Encino; Linual D. Smithey, Pacific Palisdaes; Lloyd E. Lydon, Northridge, all of Calif.

[73] Assignee: Hughes Aircraft Company, Culver City, Calif.

[22] Filed: Sept. 18, 1970

[21] Appl. No.: 73,399

[52] U.S. Cl. .................................73/178 R, 353/11
[51] Int. Cl. .............................................G01c 21/00
[58] Field of Search.............73/178 R, 178 T, 178 H; 340/27; 353/11, 12

[56] References Cited

UNITED STATES PATENTS 3,486,815   12/1969   Roscoe.....................73/178 X

*Primary Examiner*—Donald O. Woodiel
*Attorney*—W. H. MacAllister and Walter J. Adam

[57] ABSTRACT

A display system is disclosed for a navigation director system in which a portion of an azimuth stabilized navigation chart is displayed optically with the aircraft position on the chart at the center of the display, and a selected radial course for VOR airway navigation is displayed optically as a course bearing indicator (CBI) in the form of an arrow that points to a course bearing on an azimuth stabilized compass ring. The center of the arrow is replaced by a lateral deviation bar (LDB) that is displaced from the CBI in proportion to the angular deviation of aircraft position from the selected course. For area navigation between selected way points on the chart, the CBI is positioned to indicate the course bearing of a computed great circle route and the LDB is displaced in proportion to the crosstrack distance off course. For conventional VOR navigation, the chart display may be independently turned off.

15 Claims, 5 Drawing Figures

INVENTORS.
CHARLES J. STEIGLEDER,
LINUAL D. SMITHEY,
LLOYD E. LYDON,
BY Walter J. Adam
ATTORNEY.

AIRCRAFT HORIZONTAL SITUATION NAVIGATION DISPLAY SYSTEM

BACKGROUND OF THE INVENTION

This invention relates to a flight navigation system, and more particularly to a flight navigation system which pictorially displays current aircraft position on a chart over which is superimposed unambiguous guidance symbology for either conventional VOR (radial airway) navigation or computer controlled, point-to-point area navigation.

Flight navigation systems have been developed which provide pilots of high performance aircraft with steering commands for flying a predetermined course. One such integrated system involves receiving magnetic bearing information from a VHF omnirange (VOR) station by which pilots may fly predetermined airways from a departure point to a destination point within the geographic area serviced by the VOR station or stations. The airways are established from a departure point to a destination point within the geographic area serviced by the VOR station or stations. Ordinarily, flights are made from one station's coverage to another station's coverage on a radial of the one station, after which a radial of the other station is selected as the desired course.

The technique for VOR navigation is to select and fly a radial course to or from a particular station as shown on an airways chart. The radial bearing of the aircraft relative to the selected station will be as selected only when on course. A special receiver tuned in to the selected station automatically determines any angular deviation $\rho$ of the aircraft's position from the selected radial course. The selected course is continually displayed by a course bearing indicator (CBI) in the form of an arrow pointing to the selected radial course bearing on an azimuth stabilized compass ring. Deviation is also displayed and may be employed as a steering command for the pilot or an error signal for an autopilot. That deviation is displayed by a lateral deviation bar (LDB) in the form of a movable center portion of the CBI. Angular deviation is presented with proper "-sensing" whether the aircraft is navigating inbound or outbound on a VOR course.

A more recent development is a navigation system using stations operating in the L-band with distance measuring equipment (DME), such stations being referred to as TACAN stations. The DME consists of a transponder at the station which is interrogated periodically by an aircraft tuned to that station. The time delay in receiving a return signal from the transponder is measured by the receiver in the aircraft to provide the range of the aircraft from the station. Once the range and angular position are known, the pilot may fix his position on a VOR navigation chart.

Many VOR stations operating in the frequency band from 108 to 118 mHz are also equipped with L-band TACAN equipments. Those are commonly referred to as VORTAC stations. In an area serviced by such a VORTAC station, a flight may be made from one position on a radial at a given range from the station to another range on the same radial using either VHF or L-band equipment for bearing measurements and L-band equipment for range measurements.

To assist pilots using VORTAC navigation, integrated flight instruments have been developed by different manufacturers which employ a mechanical device to display not only the radial course selected and the angular deviation therefrom, but also range from the station. One such instrument displays aircraft heading by positioning a compass card (relative to a lubber line at the top for headings-up display) using a selsyn system connected to a gyro stabilized magnetic compass. A course arrow is rotated about the center of the compass card to indicate the bearing of the VOR radial course selected, and a movable center portion of the course arrow referred to as a lateral deviation bar (LDB) is displaced to the right or left in proportion to the angular deviation $\rho$ from the selected radial course with proper "sensing" whether inbound or outbound on a VOR radial course. A flag or arrowhead on the face of the instrument indicates whether the aircraft is flying to or from the station selected, and a digital device displays the range from the station selected.

While such a mechanical display instrument does provide aircraft heading, range, and angular deviation from a selected radial course to or from a VORTAC station, the pilot must still refer to his VOR navigation chart to determine his position relative to, for example, a check point. Therefore, even though such an instrument is called a horizontal situation indicator (HSI), it does not display the total horizontal situation, at least not in a familiar reference. It would be desirable to display a VOR navigation chart on the same instrument with the current position of the aircraft automatically indicated on the chart. Then the navigation problems of the pilot are significantly simplified in that the pilot can see his position at all times in a familiar reference. That is helpful should there be a sudden need to alter the flight plan and fly another course (VOR radial) of the same or different station until the aircraft reaches the check point. The range information is then primarily useful only in estimating time to go, such as to a check point.

Another more recent development made prior to this invention is a navigation director having a display in which steering symbology is integrated with current position presentation on a chart to provide a capability for accurately navigating between any two selected geographic points designated by latitude and longitude. The heart of the navigation director is a digital computer which processes air data, magnetic heading and VORTAC data to continually calculate aircraft position in latitude and longitude. Position data are presented to the pilot by moving an optically displayed map on the face of the instrument until the aircraft position thereon is positioned at the center marked by a permanently fixed symbol representing the aircraft. Another permanently fixed symbol is placed at the top of the instrument just outside a rotating card which repeats gyro-stabilized magnetic compass information to display aircraft heading. The computer rotates the optically displayed map so that it is always oriented in the display with magnetic north in the direction of 0° on the rotating compass card. In that manner, current position of the aircraft is continually displayed on a navigation chart which is always properly oriented for the actual aircraft heading, i.e., which is azimuth stabilized for a heading up display.

The computer of the navigation director also computes a great circle route between the two selected points commonly referred to as way points. A segment of this great circle route is presented to the pilot by a route segment indicator (RSI) over the displayed navigation chart. The RSI will pass through the center of the display only when the aircraft is on course and only then will point to the course bearing on the compass card. If the aircraft is off course, end portions of the RSI are displaced from the center of the display a distance proportional to the cross-track distance d of the aircraft position from the computed great circle route with constant sensitivity. A center portion of the RSI is displaced a distance Kd where K is an arbitrary constant to provide a vernier display of the lateral deviation of the aircraft from the computed great circle route. Such a vernier deviation indicator (VDI) is important to enable the pilot to steer an asymptotic path onto the computed great circle route.

It should be noted that even when the aircraft is on course, the RSI of the previous navigation director display does not uniquely point to the course bearing. Instead, a command heading indicator is displayed in the form of a diamond against the compass card to indicate a computed heading that should be maintained. However, the aircraft heading will generally be sufficiently close to the course bearing for the end of the RSI closest to it to be accepted as a course bearing indicator. In any case, the pilot will be guided by the computed heading indicator in maintaining aircraft heading for the computed great circle route. In that manner the navigation director displays steering symbology against a chart on which way points are arbitrarily selected in a form similar to that displayed by an integrated flight instrument for VOR navigation against a blank background. However, the similarities are only superficial because of the important difference just noted. Another difference is that the lateral deviation displayed in VOR integrated flight instruments is angular deviation from the course. The greater the range to the station, the greater is the cross-track distance to the selected radial course so that sensitivity to deviation from the desired course is not constant.

In the navigation director display, the vernier display indicator (VDI) is displaced a distance proportional to the cross-track distance of the aircraft position to the computed great circle route. The pilot does not need to make any calculations to determine the perpendicular distance of the aircraft position to the great circle route.

It would be desirable to integrate display of navigation symbology for computer supervised off-airways navigation, commonly referred to as area navigation (RNAV) with a VOR display system in order that the pilot may select a flight course along radials of VOR stations, or great circle routes between arbitrarily selected way points, using VOR/DME stations (i.e., stations having VOR transmitters and DME transponders) just for periodically checking and correcting the computed position of the aircraft. Such an integrated navigation instrument provides greater navigation capability.

SUMMARY OF THE INVENTION

The present invention is provided in a flight navigation system having a VOR receiver for navigating radial airways and computing means for determining a navigation route between specified way points on a chart, such as a VOR airway chart, and means for continuously displaying aircraft position on an image of the chart by optically displaying a portion of that chart image on a display surface having an aircraft symbol fixed at the center thereof. A servo system positions the chart image such that the portion to be viewed on the display surface is continually placed with the aircraft position at the center of the display surface. Another servo system continually orients a compass ring around the aircraft symbol of the display surface so as to continually present the magnetic heading of the aircraft at a lubber line fixed in position relative to the display surfaces (in the 12 o'clock position for a headings-up display). Through another servo system, the computing means rotates that portion of the chart image displayed such that longitudes are always parallel to a diameter of the display surface passing through true north and south on the compass ring (as opposed to magnetic north indicated on the compass ring by a 0° mark).

The computing means further determines the difference $\phi$ between the geographic bearing $\theta$ of the computed navigation route between selected way points and the magnetic heading of the aircraft. It also determines the linear deviation (i.e., cross-track distance as opposed to angular deviation) of the aircraft position from that route. The VOR receiver tuned to a selected transmitting station, and set for navigation to or from the selected station on a desired radial having a known geographic bearing from 0° to 359°, continually computes the angular deviation of the aircraft position from the selected radial. Thus, the computing means produces two signals, one proportional to the angle $\phi$ between the route bearing $\theta$ and the magnetic heading, and the other proportional to the linear deviation $\rho$ while the VOR receiver produces two similar signals, one proportional to geographic bearing $\theta'$ of the radial selected for the navigation route called course datum, and the other proportional to angular deviation $\rho'$ of the present aircraft position from the selected radial.

According to the present invention, the display means includes means for optically projecting on the display surface a course bearing indicator (CBI) in the form of an arrow passing through the center of the display surface (but with the center portion omitted) at an angle $\phi$ with respect to the aircraft heading such that $\phi$ represents the difference between the aircraft heading and the route bearing $\theta$ or course datum $\theta'$, each of which may be referred to as a course bearing. In place of the omitted center portion of the CBI, there is optically projected a lateral deviation bar (LDB) always parallel to the CBI but displaced therefrom a distance proportional to linear (cross-track distance) deviation $\rho$ or angular deviation $\rho'$. Switching means selects the signals $\phi$ and $\rho$ from the computing means for computer supervised navigation and the signals $\theta'$ and $\rho'$ from the VOR receiver for VOR airway navigation to display in either case a course bearing and deviation of the aircraft position from the course on which the aircraft should be. The course itself is not being displayed on the chart, but when deviation is zero, the CBI will be over the course on the chart, and the LDB will be in line with the CBI. In the case of selecting the signals $\theta'$ and $\rho'$ from the VOR receiver, the display means includes means for determining the difference $\phi'$ between the aircraft heading and the bearing $\theta'$, and for producing a proportional signal to position the course bearing indicator. When navigation symbology is to be displayed by itself, i.e., without displaying a portion of the navigation chart, separate switching means is actuated to turn off the display of the chart.

The novel features of the invention, as well as the invention itself, both as to its organization and method of operation, will best be understood from the accompanying description, taken in connection with the accompanying drawings, in which like reference characters refer to like parts, and in which:

DESCRIPTION OF THE PREFERRED EMBODIMENT

Figure 1:
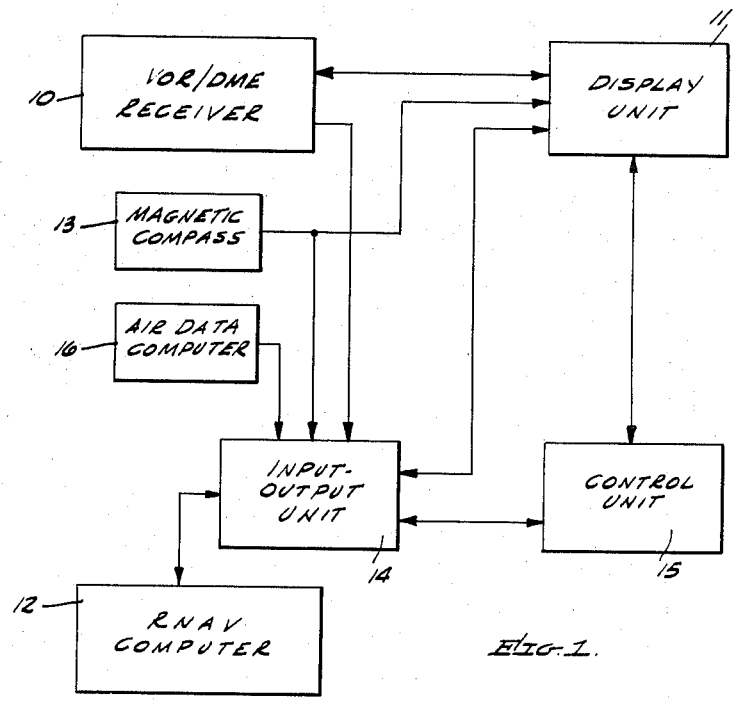
FIG. 1 is a simplified block diagram of the navigation system of the present invention.

Reference is first made to FIG. 1 showing a simplified block diagram of a navigation system for an aircraft which embodies the present invention. Basically, the navigation system is course oriented in that it employs either VOR navigation or area navigation (R-NAV). In the VOR mode, a VOR/DME receiver 10 is employed to establish a route or course to be flown using conventional airway navigation techniques, but with a display unit 11 that, according to the present invention, is adapted to be alternatively used for either VOR navigation or area navigation from way point to way point on a chart presented by display unit 11 following a route or course computed by an RNAV computer 12. A magnetic compass 13 is coupled to the display unit 11 using conventional selsyn devices to cause a compass ring 24 (FIG. 2) to be oriented with respect to a lubber line to continually present to the pilot the present heading of the aircraft. The magnetic compass 13 is also coupled through an input-output unit 14 to the RNAV computer 12. The computer uses magnetic heading and other data to compute aircraft position between way points every 0.5 second using dead reckoning navigation techniques. Way points are entered into the computer 12 through a control unit 15. The other flight data necessary for the dead reckoning navigation programmed in the computer 12 is also entered through the input-output unit 14, such as air data from a computer 16, a known navigation instrument normally used during flight.

As will be pointed out more fully hereinafter with reference to FIG. 3, the control unit 15 is provided with the facility for selecting navigation charts and way points on the chart. Once a sequence of way points have been selected to define a route to be flown from a point of origin to a destination point, the computer 12 will determine the magnetic bearing data of a course to be flown from the last way point or point of origin to the next way point or destination point. The computer 12 will also determine the present magnetic heading of the aircraft and transmit to the display unit 11 a signal proportional to the difference $\phi$ between the magnetic heading and the course bearing with a proper sign (polarity) in order that a course bearing indicator (CBI) 22 (FIG. 2) may be displayed relative to a display of the aircraft heading. In addition, the computer 12 determines the linear cross-track deviation of the present position from the computed course and produces through the input-output unit 14 an analog signal proportional to that deviation with the proper sign (polarity) to displace from the CBI a lateral deviation bar (LDB) 21 (FIG. 2) a distance proportional to the distance the aircraft is off course, and in the proper direction, i.e., to the right if off course to the left, and vice versa.

The VOR navigation chart on which the present course appears is selected by the computer 12 from a library stored in the display unit 11. The library consists of chart negatives on a film contained in a preloaded cassette for the geographic area and altitude to be flown. For example, 23 frames on a film will cover the entire continental United States at high altitude. As the flight progresses, from one chart to another, the pilot calls for the next chart to be displayed. Alternatively, the computer may be employed to call for the next chart, using a preprogrammed flight profile. However, only a small portion of each chart (about 5 percent) is actually displayed for view as the chart is positioned by the computer in the display unit 11 to place the current position of the aircraft on the chart at the center of a circular display surface where a symbol 23 (FIG. 2) of the aircraft is permanently fixed. The computer 12 also orients the portion of the chart appearing on the display surface such that longitudes are always parallel to a diameter of the display surface passing through true north, which will vary from 0° on the compass ring since the compass ring is controlled by a magnetic compass, i.e., which will be the local magnetic declination. In that manner, the pilot is not only presented with RNAV steering symbols but also aircraft position on the chart that is azimuth stabilized, i.e., oriented with respect to the aircraft heading.

When the pilot elects to fly a VOR navigation route, a four-position switch on the control unit 15 is turned to a second position to remotely actuate switches in the display unit 11 to substitute signals $\phi'$ and $\rho'$ for the signal $\phi$ and the lateral deviation signal $\rho$ where $\phi'$ is determined within the display unit 11 as the difference between the magnetic bearing of a radial selected for the course to or from a station and the present magnetic heading of the aircraft. The VOR/DME receiver 10 determines the angular deviation of the aircraft present position from the selected radial and produces a signal $\rho'$ for display in place of the signal $\rho$ representing a lateral deviation of the aircraft from a computed course.

Figure 2:
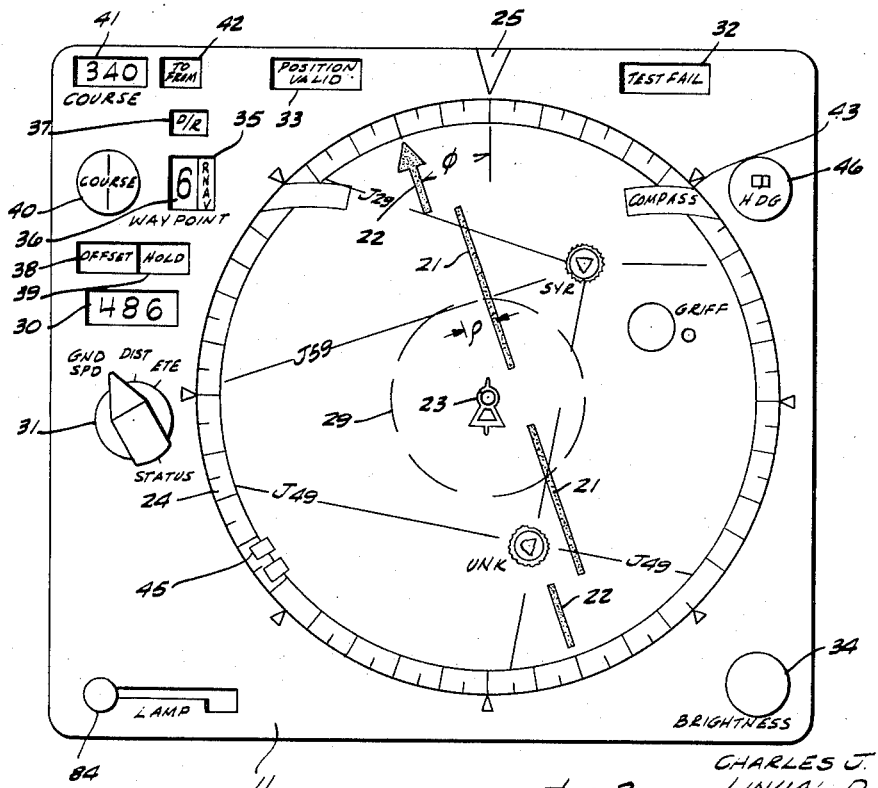
FIG. 2 is a front view of a display unit in the system of FIG. 1.

The navigation symbology displayed by the unit 11 for the VOR mode of navigation differs from the navigation symbology for the RNAV mode only in that the LDB 21 is displaced from the CBI 22 as shown in FIG. 2 a distance d from the center of a display surface (marked by the aircraft symbol 23) proportional to angular deviation $\rho'$ instead of linear cross-track $\rho$. In both instances, a triangle at the head of the CBI points to the compass bearing of the flight course on a compass ring 24 which is continually positioned with respect to a lubber line 25 to indicate the current aircraft heading.

As the heading off the aircraft changes, the LDB, CBI and compass ring will rotate together about the center of the display surface. Thus, as the magnetic heading of the aircraft increases, for example, the difference between the magnetic heading and the course bearing increases for the navigation situation illustrated, the increase taking place in the same manner for both RNAV and VOR modes of navigation. Accordingly, from viewing the display there is no difference in interpretation of the CBI and its position relative to the compass ring and lubber line 25, and only a slight difference in interpretation of any displacement of the LDB. The difference is that only angular deviation of the current aircraft position from a selected radial is available during a VOR mode of navigation, while during the RNAV mode, the deviation information available is the distance of the current aircraft position from the course along a line normal to the computed great circle route referred to hereinbefore as linear cross-track deviation. This allows one display panel to be used for both VOR and RNAV modes of navigation.

Another advantage of the present invention is that a portion of the navigation chart on which the present position of the aircraft appears may be displayed not only for the RNAV mode but also for the VOR mode. It should be noted that the navigation situation shown in FIG. 2, which illustrates the front or display panel of the display unit 11 (FIG. 1) is typical of an RNAV situation where the course $\theta$ of 310° passes over a point near a station UNK which could be the last way point passed. The next way point could be another station similar to the station UNK or any other geographic point which may appear on the display surface as the aircraft proceeds. The course of 310° is assumed to be the course bearing of a great circle route segment calculated by the computer 12, but the computer 12 need not be programmed for great circle navigation since the present invention relates to a new and improved display system without regard to the particularities of the computer supervised area navigation (RNAV) techniques employed.

The LDB to the right of the aircraft symbol 23 in the situation depicted in FIG. 2 indicates that the aircraft is too far to the left of the great circle route calculated by the computer 12. Accordingly, to get back on course, the aircraft heading must be changed to a heading to the right of the 310° course selected; how much to the right in degrees depends upon how quickly the LDB is to be brought in line with the CBI. When in line, both will appear on the chart over the great circle route, calculated by the computer. It should be noted that neither the LDB nor the CBI appears over that route until the LDB indicates lateral deviation has been reduced to zero. If there is no wind, or the wind direction is to or from the course bearing, the aircraft heading will coincide with the course bearing. Otherwise there will be a difference angle $\phi$ even when the aircraft is maintaining its course since the aircraft heading must always be into the wind with an angle $\phi$ sufficient to compensate for the effects of the wind on the progress of the aircraft over the ground.

In the VOR mode of navigation, the course or route being flown is a radial line to or from a station such as the station UNK. Assuming the radial selected from the station UNK is 310°, the CBI is rotated at the time the radial is selected until it points to the bearing of 310° as shown. Since the LDB is displaced to the right of the aircraft symbol 23, the aircraft heading must be increased, as for the RNAV situation, but how much the heading must be increased will now depend not only upon how quickly the course is to be corrected, but also how far the aircraft is from the station since a given angular deviation $\rho'$ represents a greater lateral deviation for a greater distance to the station, as noted hereinbefore.

In the past, navigation display instruments for VOR navigation have presented only steering symbology and not aircraft position on the VOR chart. Accordingly, the pilot has had to determine his distance from the station through distance measuring equipment (DME) which provides a digital display of the distance to or from the selected station. Then the pilot has had to locate the station and the selected radial to fix his present position on the navigation chart. By displaying the navigation chart in accordance with the present invention, the position of the aircraft is being continually presented. However, if only the steering symbology is desired for the VOR mode of operation, the four position switch referred to hereinbefore in the control unit 15 may be turned to a MAP OFF position to cause optical projection of the navigation chart onto the display surface of the unit 11 within the compass ring 24 to be turned off, or blanked off.

The display panel illustrated in FIG. 2 is primarily used to display course-oriented navigation information, but includes means such as control knobs to control the manner in which the information is to be displayed and to display auxiliary data through a three-digit indicator 30 that exhibits numerical information requested via a read-out selector switch 31. That information includes present ground speed (GND SPD) of the aircraft in knots, horizontal distance (DIST) in nautical miles to either the next way point or a way point being confirmed in the RNAV mode, and estimated time enroute (ETE) required to reach the next way point at the present ground speed. When a way point is being confirmed, ETE selection presents time required to reach the way point being confirmed via a direct, great circle route at the present ground speed. In addition, the switch 31 has a fourth position used to initiate a self-test routine in checking the equipment status. During a computer self-test routine, a failure or an out-of-tolerance condition will energize a test failed annunciator 32.

Although frequent reference has and will be made to various operations and functions of the computer 12 (FIG. 1) to describe the operation of a specific embodiment of the present invention, it should be understood that the present invention is primarily concerned with the display unit 11 (FIG. 1) for presentation of navigation information as shown and described with reference to FIG. 2. The principle elements of that display are present heading, course bearing, and deviation of the aircraft position from the computed (RNAV mode) or selected (VOR mode) course. In the case of the RNAV mode, the computer produces a signal proportional to the difference between present heading and computed course bearing, but that is simply a matter of choice or design. Display of the computed course bearing relative to the present heading could be accomplished in the RNAV mode in a manner similar to presenting the selected course bearing relative to the present heading in the VOR mode. However, as will be appreciated more fully from a description of an electrical diagram for the display unit shown in FIG. 4, it is more convenient to program the computer to read in from the magnetic compass 13 the present heading of the aircraft, calculate the difference between the present heading and computed course bearing, and produce a signal $\phi$ proportional to that difference.

Before proceeding with a description of the electrical diagram in FIG. 4, a description of the exemplary display unit illustrated in FIG. 2 will be completed and a description of a front panel for the control unit 15 illustrated in FIG. 3 will be given. As noted hereinbefore, aircraft position is indicated by the symbol 23 located at the center of the display surface in FIG. 2. The selected navigation chart is positioned under the aircraft symbol by the RNAV computer to show aircraft position which is calculated every 0.5 second using dead reckoning techniques. The presentation appears as a map moving under the aircraft symbol, much the same as the terrain moves under the nose of the aircraft because the RNAV computer continually orients the chart for a magnetic heading up. Every 4 seconds, the computer obtains a new fix on the aircraft position from VOR and DME data. Thus, the computer provides supervised dead reckoning navigation between selected way points.

The charts are stored on a 35 millimeter film cartridge, each film containing 350 frames of charts and binary coded data pertaining to the charts. The charts are especially designed for optical projection onto the display surface inside the compass ring 24. Accordingly, chart features appear as white lines on a black background. This assures good visibility under all levels of cockpit lighting when the map brightness is properly adjusted through a control knob 34.

Charts are provided in three scales to facilitate interpretation of details for high altitude flights, low altitude flights and transitions and approach flights. The computer automatically scales the deviation signal $\rho$ for the chart being displayed. If the present aircraft position is not on a chart selected, such as when the aircraft is too far off course while navigating near the edge of a chart, the computer will determine this condition and energize an annunciator 34 warning that the aircraft position display is invalid. To facilitate reading the magnitude of deviation from a selected or computed course, one or more scaling rings may be provided. One ring 29 illustrated may be provided by etching it on a translucent face plate for the panel and edge lighting the face plate. A second, and even a third such ring could be added in the same way, and their presence on the display could be readily removed by the pilot by turning the power off to the edge lighting lamp.

An annunciator 35 is energized when the display unit is operating in the RNAV mode. In a window 36 next to the RNAV annunciator there is displayed, under computer control, the next way point if one is programmed. Otherwise, the window 36 is dark, and in manual operation of the chart display, the next way point is shown when that way point has been entered into the computer. As the computer calculates the course bearing $\theta$ and deviation therefrom $\rho$, aircraft position is periodically checked with external navigation aids, such as bearing and range information from the VOR/DME receiver 10 as noted hereinbefore. When data from external navigation aids are not sufficient to supervise the position calculating process in the computer 12, the computer will energize an annunciator 37 which indicates that unsupervised dead reckoning computations are being used for the navigation display.

In the RNAV mode, it is possible to manually offset to the right or left the navigation guidance from the originally programmed course to a parallel course. While an offset is being introduced, an annunciator 38 is energized to indicate that an offset course is being presented on the display. Next to the offset annunciator is a hold annunciator 39 which is energized when a hold point has been inserted, thereby indicating that route navigation is being held while guidance is provided to the hold point.

In the VOR mode of operation, the pilot may perform standard VOR radial navigation. To accomplish that, a course control knob 40 is used to dial in the desired radial course in degrees relative to magnetic north. The course dialed is displayed through a window 41. An annunciator 42 indicates whether the selected radial course is being flown to or from the station.

Other features of the display unit shown in FIG. 2 which operate independently of the RNAV computer 12 and the VOR/DME receiver 10 are nevertheless used in conjunction with navigation in the RNAV or the VOR mode. The most important is the compass ring 24 which provides an indication of the current aircraft magnetic heading. When the aircraft compass input is not valid, a mechanical flag 43 appears near the top of the display surface. Similarly, while navigating in the VOR mode, a mechanical flag (not shown) appears when a VOR signal received is invalid.

A heading marker 45 consisting of two white blocks may be positioned to any desired heading on the compass ring 24 by turning a control knob 46. To reach that heading, the pilot simply steers toward the heading marker to align it with the lubber line 25. Alternatively, the pilot may use the autopilot to bring the aircraft to the selected heading automatically. Thus, once the heading marker 45 has been positioned by operation of the control knob 46, the heading marker will rotate with the compass ring 24 and, except for providing an error signal to the autopilot, the position of the heading marker will not affect the course of the aircraft or the navigation symbology displayed.

Figure 3:
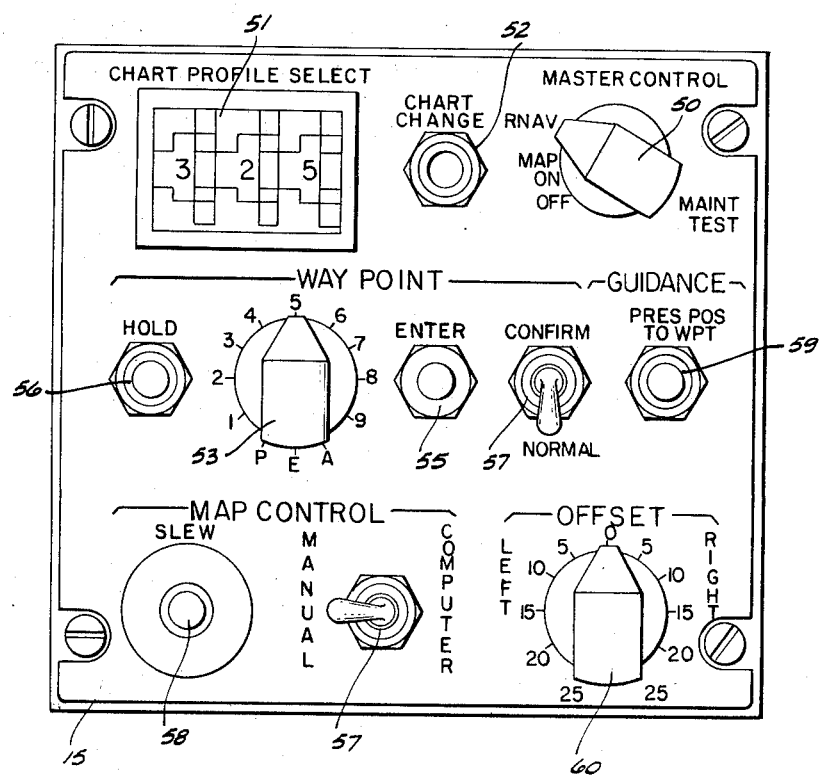
FIG. 3 is a front view of a control unit in the system of FIG. 1.

Referring now to FIG. 3, the control unit 15 provides for navigation chart selection and system control in the RNAV mode of navigation. A four position rotary switch 50 referred to hereinbefore is employed to select the desired system functions and to initiate a comprehensive self-test program. In the RNAV position shown, the navigation symbology for computer controlled navigation is displayed with a display of the navigation chart as shown in FIG. 2. In the MAP ON position the navigation chart is displayed as in the RNAV mode but the navigation symbology is controlled by the VOR/DME receiver. In the MAP OFF position, the navigation symbology is for VOR navigation as in the MAP ON position, but the chart display is turned off.

As noted hereinbefore, a total of 350 frames of charts and data are available to the pilot. An individual frame is selected by dialing a three digit code number through selector switches 51. In practice, the navigation charts are indexed on a frame having a code number 001 and are assigned code numbers between 002 and 351. The frame code number selected appears across the selector switches and a corresponding number in binary code is transmitted from the switches to the RNAV computer. A physical change of the chart in the display is not made until a chart change push button 52 is pressed, at which time the RNAV computer directs selection of the chart indicated.

The switches 51 may also be employed to select predetermined flight paths for approaches and departures defined by way points permanently stored in the computer. These paths may be assigned numbers not used for chart identification such as 401 through 799, and may be indexed on the chart where they appear. In practice, the pilot selects a particular path by dialing the appropriate number on the switches 51. The selected profile, including prescribed ground navigation aids, are automatically inserted into the computer by placing a way point select switch 53 in position A with a map control switch 54 in the manual position as shown. When an enter push button 55 is pressed, the entire prestored flight profile data is retrieved for use in the RNAV computer. Since this is only a data transfer operation, no map positioning operation is involved.

A series of individual way points numbered 1 through 9 may be manually selected and entered for navigation in the RNAV mode. For example, a route to a particular destination point may be defined by selecting up to nine way points on the chart or charts covering the area between the departure point and the destination point. Selecting the way points in sequence is then accomplished by setting the switch 53 to positions 1, 2, 3 . . . 9 in sequence, and at each position selecting the appropriate chart and manually positioning the desired geographic point on the map at the center of the display. Once that has been accomplished for a particular way point, the enter button 55 is pressed to cause the computer to read in coordinate data of that way point.

Position P of the select switch 53 is used to enter coordinate data of the current aircraft position as though it were a way point. The last position E of the switch 53 is reserved for entering way points from an external source, such as another avionics computer.

A hold push button 56 is provided to enable the pilot to designate a point at the center of the chart display as a temporary way point. Guidance calculations are then referenced to that point while all programmed navigation data are retained until the hold button is pressed a second time at which time the normal RNAV routine is resumed.

To confirm previously selected way points, a two position switch 57 is placed in a confirm position to cause the computer to automatically select the proper chart and position the selected way point indicated by the switch 53 at the center of the display. In the normal position of the switch 57, map control is governed by the switch 54. A slew control 58 is provided for manually positioning a chart. Thus, when the switch 54 is in the manual position, the chart being displayed can be slewed in any direction by simply pushing the slew control 58 in that direction. That facilitates manually positioning any geographic point on a chart to the center of the display for entry into the computer as a way point.

Once way point data has been entered, any way point may be selected for navigation guidance by simply operating the switch 53 to the selected way point and pressing a push button 59 in the RNAV mode (i.e., with the master control switch 50 in the RNAV position). However, in practice usually the next way point in sequence is selected, and once a selected way point has been reached, the next way point in sequence is selected by the RNAV computer without the necessity of operating the switch 53. Thus, the normal operation is to advance the switch 53 to the first way point position 1 after the present aircraft position data has been entered with the switch in position P. Navigation guidance to the first way point is then initiated by pressing the push button 59. Thereafter, the remaining way points entered are selected in sequence and announced by the way point indicator 36 (FIG. 2) under control of the RNAV computer as the flight progresses over the route specified by the entered way points, the last way point entered being a missed approach point; the next to the last way point would be the destination point.

During flight under RNAV computer control, an offset course or track may be flown to the right or the left, as noted hereinbefore, such as to avoid traffic or a storm, without changing the programmed route (i.e., without changing the way points which have been entered). That is accomplished by a switch 60 which may be rotated to one of five positions to the left or right of zero to offset the programmed course from 5 to 25 increments left or right, where each increment may be arbitrarily programmed to be any distance. To accomplish that, the position of the switch 60 is transmitted to the computer which then simply takes it into account in computing lateral deviation $\rho$ from the otherwise programmed course bearing $\theta$.

An important feature of the present invention is the ability to present continuously aircraft position on a navigation chart with appropriate guidance symbology for the mode of navigation selected. The pilot can select the RNAV mode and proceed on a direct point to point basis, or he may choose to fly a VOR course, or instead fly a magnetic heading. In each case, the display unit provides guidance symbology in a total horizontal situation on a single panel.

Before describing how the guidance symbology is superimposed on the chart with reference to FIG. 5, the manner in which the individual symbols are separately controlled will first be described with reference to the electrical diagram in FIG. 4.

Figure 4:
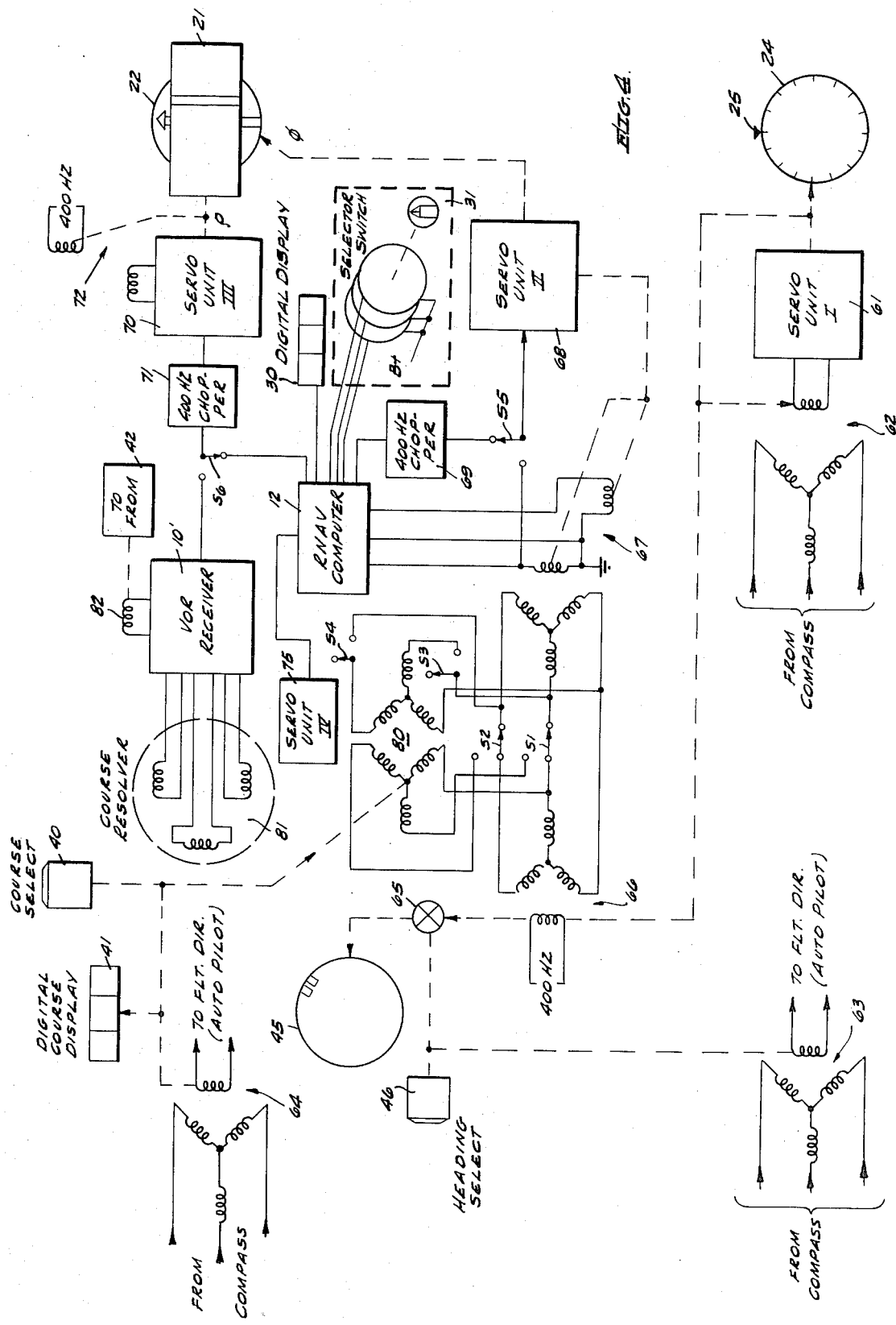
FIG. 4 is an electrical schematic diagram of the display unit of FIG. 2.
Figure 5:
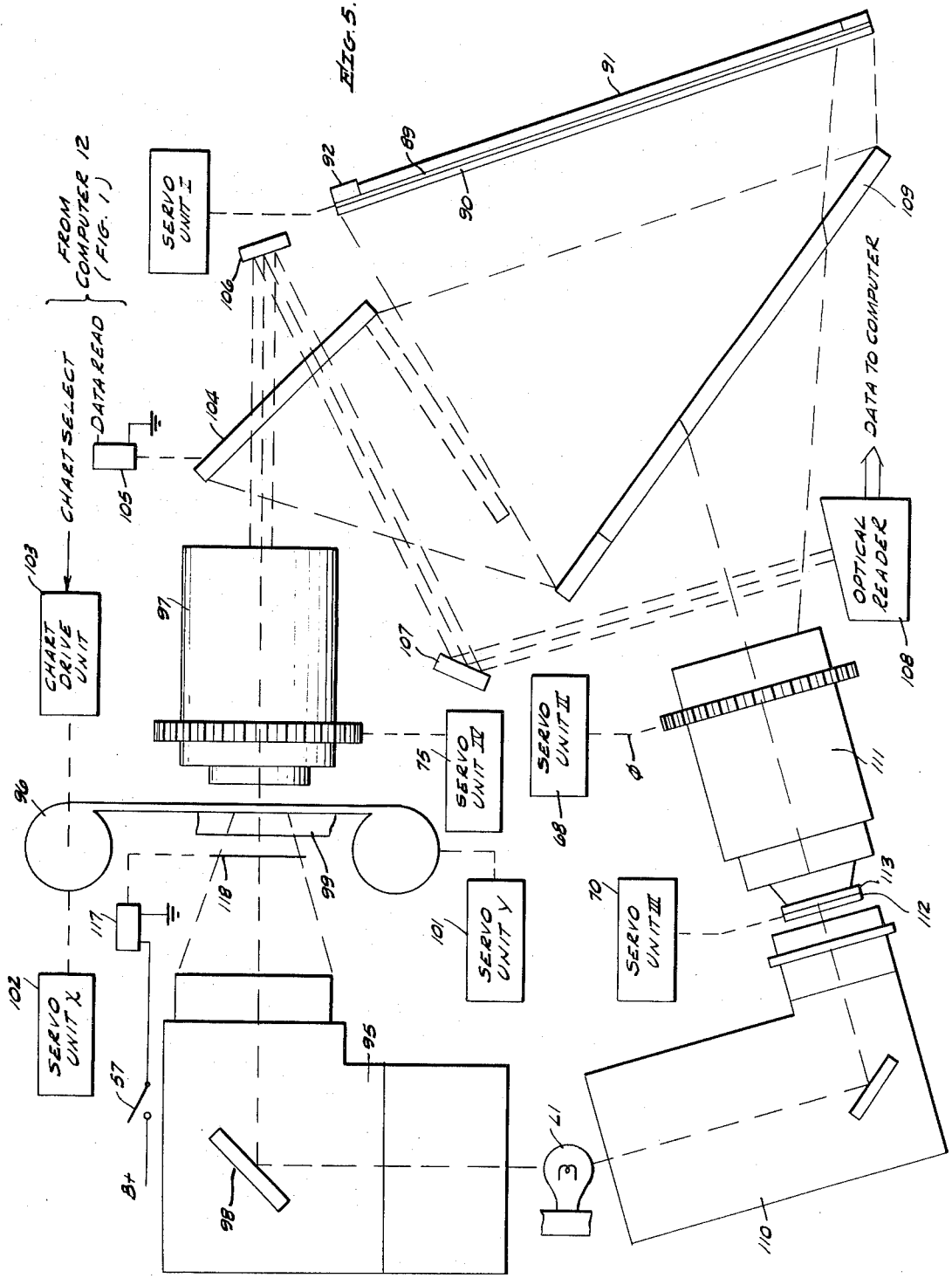
FIG. 5 is an optical diagram of the display of FIG. 2.

Referring now to FIG. 4, the compass ring 24 is positioned relative to a lubber line 25 by a first servo unit 61 which drives a rotor of a selsyn 62 to an electrically zero position which corresponds to the rotor position of a selsyn generator mechanically driven by a magnetic compass to generate input signals to the stator coils of the selsyn 62. In that manner, the compass ring 24 is rotated with respect to the lubber line 25 as the heading of the aircraft changes with respect to magnetic north. Similar selsyn generators are connected to the magnetic compass to provide identical, but electrically isolated input signals to selsyns 63 and 64 used to provide error signals to a flight director (autopilot) to automatically fly a selected heading in the case of the selsyn 63 and a selected course in the case of the selsyn 64.

Upon selecting a heading through the knob 46, the rotor of the selsyn 63 is rotated with the heading marker 45. The latter is driven through a differential 65 so connected as to permit the heading marker to be synchronously driven by the first servo unit 61 so that once a heading is selected by placing the marker 45 at the desired heading on the compass ring 24, as the heading of the aircraft is changed, the compass ring 24 and the heading marker 45 will rotate together. Any deviation from the selected heading will produce an error signal across the rotor coil of the selsyn 63. If the autopilot is use to fly the selected heading, that error signal is used to bring the aircraft back on heading. Under manual control, the pilot simply turns the aircraft in the direction of the heading marker to bring the heading marker in alignment with the lubber line 25.

The servo unit 61 also drives a rotor of a selsyn generator 66 to generate a magnetic heading signal. In the RNAV mode of operation, the magnetic heading signal is fed directly into a vector resolver 67 comprising a selsyn having stator coils connected to the stator coils of the selsyn 66 and two orthogonal rotor coils connected to the RNAV computer 12. In that manner, the computer 12 receives from the resolver 67 signals proportional to the sine and the cosine of the magnetic heading for the purpose of computing the difference $\phi$ between the magnetic heading of the aircraft and a computed course $\theta$ between way points. The servo unit 68 responds to that signal $\phi$ to null the sine coil of the rotor in the selsyn 67 thereby rotating the course bearing indicator 22 and the deviation bar 21 through an angle corresponding to the difference between the current aircraft heading and the computed course bearing to point the course bearing indicator 22 to the computed course bearing on the compass ring 24.

The RNAV computer 12 also computes the lateral deviation of the aircraft's present position from the great circle route being navigated between way points. That lateral deviation signal is applied to a third positioning servo unit 70 through a chopper 71. As the LDB 21 is driven in response to the input signal from the chopper 71, a rotor coil of a resolver 72 is rotated to introduce into a summing junction of the servo unit 70 a feedback signal to null the output of that summing junction.

The RNAV computer 12 also transmits a signal to a fourth servo unit 75 proportional to the magnetic heading in order to so rotate the chart being displayed as to maintain longitudes thereof parallel to a diameter of the compass ring 24 passing through true north (i.e., 0°± magnetic declination). Thus with switches S1–S6 in the positions shown for the RNAV mode of operation, the display unit presents aircraft magnetic heading, computed course bearing to the next way point, aircraft position, and linear cross-track deviation of that position from the great circle route or course to the next way point. In addition, the pilot may select for the digital display 30 computed ground speed, distance to the next way point or estimated time enroute to the next way point by positioning the selector switch 31 as described with reference to FIG. 2.

The selector switch transmits to the RNAV computer 12 a binary code identifying the data to be displayed. Both the binary code and the data are received and transmitted by the computer 12 through the input/output unit 14, as is all other data and control signals in the manner described with reference to FIG. 1. Direct connections to the computer are illustrated in FIG. 4 for simplicity only, it being understood that digital computers always receive and transmit signals through an input/output unit. In the case of binary information received, as from the selector switch, the computer reads in the information directly at the appropriate time, determined by its stored program, while analog signals received (such as from the resolver 67) are converted from analog to digital form in the input/output unit. Output signals from the computer, such as the deviation signal $\rho$, are converted from digital to analog form by the input/output unit 14. Thus, although the input/output unit 14 is particularly adapted to the requirements of the exemplary navigation system in which the present invention is embodied, the techniques employed, including the analog-to-digital and digital-to-analog converting techniques are conventional and widely used for control of analog systems with digital computers.

For operation in the VOR navigation mode, the switch 50 on the control unit 15 is turned to the MAP ON position, as noted hereinbefore, to change the position of each of the switches S1 to S6 in the display unit to its position alternate to that shown in FIG. 4. Since the control unit 15 is packaged in a housing separate from that for the display unit, the switches S1 to S6 are remotely operated, such as by de-energizing the relay (not shown) that is energized only while the switch 50 in the control unit is in the RNAV position.

The switch S6 in its alternate position substitutes for the linear deviation signal $\rho$ an angular deviation signal $\rho'$ produced by the VOR receiver portion 10' of the VOR/DME receiver 10 shown in FIG. 1. The switch S5 disconnects the RNAV computer 12 from the course bearing indicator servo unit 68 and connects the sine coil of the resolver 67. Since the servo unit 68 must position the course bearing indicator 22 relative to the lubber line 25 as a function of the difference $\phi$ between the current magnetic heading and a selected course, switches S1 to S4 are switched to their alternate position. Then they connect a differential transformer 80 between the selsyn generator 66 and the resolver 67 in order that the signal transmitted to the resolver 67 be equal to the difference between the magnetic heading signal (introduced through the selsyn generator 66) and the selected VOR course (introduced through rotation of the input coils in the differential transformer 80 while selecting the VOR course through the knob 40). The course selected is displayed through the window 41 by a mechanical display unit driven directly by the knob 40.

Actual selection of the VOR bearing or radial is accomplished through rotation of a rotor in a resolver 81 having its sine and cosine coils connected to a network for determining the phase difference between a radial signal received from a selected station and a reference signal applied to the coil being rotated by the course selector knob 40.

The VOR receiver 10' also includes a second phase detecting network which determines whether the aircraft is moving in a direction to or from the transmitting station and operates a flag or switch for the annunciator 35 (FIG. 2) indicating whether the aircraft is on a course to or from the station on the radial selected through the course selected knob 40. In the present embodiment, output of that second phase detector energizes a solenoid 82 that turns on one of two lamps to illuminate the work TO or FROM, whichever corresponds with the direction the aircraft is flying relative to the station tuned in. Neither the work TO or FROM need be illuminated while operating in the RNAV mode, because a seventh switch (not shown) ganged with the switches S1 to S6 disconnects power from the relay contact employed to energize one of the two lamps.

The manner in which the navigation symbology is controlled by the servo units referred to with reference to FIG. 4 will now be described with reference to FIG. 5 which illustrates an optical diagram of the display unit. The energy for displaying the navigation chart and the steering symbols, namely, the course bearing indicator and deviation bar, originates at an incandescent lamp $L_1$. Although only one lamp is shown, a second standby lamp is provided so that if the first should fail, the second may be turned on and moved into place through a selector control lever 84 shown in FIG. 2.

Separate optical channels are provided to a display surface comprising a thin film 89 of material on the front (right) side of a translucent plate 90. The material selected is preferably one which absorbs and re-radiates light. The display surface or image screen is protected by a plastic disc 91 mounted in a ring 92 driven by the first servo unit 61. The compass ring 24 (shown in FIGS. 2 and 4) is carried, and thus rotated, by the disc 91. The heading marker 45 (also shown in FIGS. 2 and 4) is carried by still another translucent disc or ring mounted for rotation in front of and around the center of the disc 91. Both rotate together except while the heading marker is being rotated through the differential 65 in response to turning the heading select knob 46 as described with reference to FIG. 4.

To project a chart on the screen 89, light from the lamp $L_1$ is directed through a condenser lens assembly 95 which directs light through a film cartridge 96 and a Pechan prism and lens assembly 97. In order to minimize the amount of infrared radiation from the lamp $L_1$ onto a chart film in the magazine 96, material selected for a mirror 98 in the condenser lens assembly 95 is preferably one which will transmit infrared radiation and reflect visible light into the film cartridge 96. To further minimize the amount of infrared radiation reaching the film of a chart being displayed, a plate 99 of material selected to reflect infrared radiation and transmit visible light is placed in front of the film.

Servo units 101 and 102 receive signals from the computer 12 (FIG. 1) to so position the film cartridge as to place the aircraft position at the center of the display surface. The chart being displayed is selected through a chart drive unit 103 under direct control of the computer, even while the map control switch 54 (FIG. 3) in the control unit 15 is in the manual position in order that chart selection may be accomplished at high speed.

The Pechan prism and lens assembly 97 is rotated by the servo unit 75 to maintain proper orientation of that portion of the chart being displayed with longitudes parallel to a diameter of the compass ring passing through true north (0°± magnetic declination) and the northern most latitude of that portion displayed tangent to the compass ring at true north. Thus, the chart displayed is selected, positioned and rotated through servo units which receive control signals from the computer in substantially the same manner as previous navigation director systems having a chart display integrated with navigation symbology display similar to that of the present invention.

Because selection of a chart and other computer operations require that binary coded data be read from the chart film in the cartridge 96, a reflecting mirror 104 is pivoted through an arc of approximately 90° in response to a data read signal applied to a solenoid 105 from the computer 12. That provides a second path for a smaller field of view to be reflected by mirrors 106 and 107 into an optical reader 108 connected to the computer. However, while the relay 105 is not energized, the mirror 104 is in the position shown and a portion of a selected chart image is reflected by mirrors 108 and 109 into the display surface of screen 89. The mirror 109 is one adapted to reflect light from the mirror 104 and transmit light from the other side, such as a half-silvered mirror.

The optical channel for the course bearing indicator 22 and the deviation indicator 21 comprises a condenser lens assembly 110 similar to the condenser lens assembly 95. Positioned between the condenser lens assembly 110 and a Pechan prism and lens assembly 111 is a first slide or reticle plate 112 for forming an image of the CBI projected into the assembly 111. A second slide or reticle plate 113 is then positioned next to the first slide to form and project into the assembly 111 the LDB 21. The two slides 112 and 113 are initially adjusted to align the LDB with the CBI while a deviation signal into the servo unit 70 and a difference signal into the servo unit 68 are both zero. That adjustment of one plate relative to another is followed by an adjustment that moves both plates until the LDB and the CBI are in the center of the display surface, and in a heading-up (12 o'clock) position. Once that adjustment is made, the slide 112 is fixed in position and the slide 113 is allowed to move laterally in response to operation of the servo unit 70. Simultaneous rotation of the CBI and LDB is then accomplished by rotation of the assembly 111 in response to operation of the servo unit 68 in a manner similar to rotation of an RSI and VDI in previous navigation director systems.

In operation, either RNAV or VOR navigation data is displayed on a chart by selective positioning of the switches S1 to S6 in FIG. 4. If chart display is not desired in the VOR mode, the master control switch 50 (FIG. 3) is placed in the MAP OFF position to open a switch S7 as shown in FIG. 5. That de-energizes a solenoid 117 to place a spring-loaded shutter 118 in the optical path of the chart image.

Although a specific embodiment of the invention has been described and illustrated herein, it is recognized that modifications and variations may readily occur to those skilled in the art. For example, the computer may be programmed for point-to-point navigation other than through a great circle route, or for navigation of any other form. The novel display system can be used to show computed course bearing and deviation therefrom in a familiar reference (i.e., on an azimuth stabilized chart) just as in the RNAV mode described by way of example, and not by way of limitation.

The novel display system may also be employed for other navigation situations, such as in making an approach to a runway on a designated bearing. For example, in conventional course localizer approaches, i.e., in an LOC mode VHF NAV equipment is used in place of the VOR equipment. Operation of the display system in the LOC mode is identical to the VOR mode described. Switching to the LOC mode would simply require substituting localizer bearing and deviation signals for the corresponding signals of the VOR equipment while the display system controls are set for operation in the VOR mode, i.e., while the master control switch 50 is in either the MAP OFF or MAP ON mode and the course control knob 40 is set to the bearing of the approach course. Presentation of the CBI on a runway approach map when lateral deviation is zero, provides graphic verification of proper approach. However, since VOR data would then not be available, the computer 12 does not receive supervisory inputs, except ground speed, from which to calculate accurate aircraft positions every 4 seconds. The D/R annunciator 37 would then be illuminated to indicate the computer is performing dead reckoning computations to position the chart. Thus, although only VOR and RNAV modes of navigation have been described as an exemplary embodiment for the present invention, it is recognized that other comparable environments may use the invention to equal advantage. Accordingly, it is intended that the claims be interpreted to include such other environments as well as modifications and equivalents in the exemplary embodiment described.

What is claimed is:

1. In an aircraft horizontal situation navigation display system, in which an azimuth stabilized image of a chart is optically projected onto a display surface within an azimuth stabilized compass ring for continual display of a portion of said chart image with aircraft position on said chart image always centered on said display surface under control of a computer in a navigation director system, said navigation director system having a receiver for producing a signal proportional to angular deviation of said aircraft position from a selected flight path on said chart with proper sign for the direction of the deviation, the combination comprising:

means for selecting a flight path;
means for optically displaying on said surface a course bearing indicator in the form of an arrow along a diameter of said compass ring;
means responsive to said flight path selecting means for rotating said course bearing indicator on said display relative to said compass ring until it points to the bearing of the flight path selected, and for azimuth stabilizing said arrow as said aircraft changes heading;
means for optically displaying on said surface a lateral deviation bar azimuth stabilized and rotated in synchronism with said course bearing indicator with the length of said bar parallel to the length of said course bearing indicator; and
means responsive to said angular deviation signal for displacing said lateral deviation bar a perpendicular distance from said course bearing indicator proportional to the amplitude of said signal in a direction corresponding to the sign of said signal.

2. In an aircraft horizontal situation navigation display system, in which an azimuth stabilized image of a chart is optically projected onto a display surface within an azimuth stabilized compass ring for continual display of a portion of said chart image with aircraft position on said chart image always centered on said display surface under control of a computer in a navigation director system, said navigation director system having a receiver for producing a signal proportional to angular deviation of said aircraft position from a selected flight path on said chart, the proper sign for the direction of the deviation, wherein said computer calculates a navigation route between two specified points on said chart and continually produces a first signal proportional to the difference between aircraft heading and a course bearing of said route, and a second signal proportional to lateral deviation of said aircraft position from said route with proper sign for the direction of the deviation, where said lateral deviation is a measure of distance from said aircraft position at any given time to said route along a line perpendicular thereto, the combination comprising:

means for selecting a flight path;
means for optically displaying on said surface a course bearing indicator in the form of an arrow along a diameter of said compass ring;
means responsive to said flight path selecting means for rotating said course bearing indicator on said display relative to said compass ring until it points to the bearing of the flight path selected, and for azimuth stabilizing said arrow as said aircraft changes heading;
means for optically displaying on said surface a lateral deviation bar azimuth stabilized and rotated in synchronism with said course bearing indicator with the length of said bar parallel with the length of said course bearing indicator;
means responsive to said angular deviation signal for displacing said lateral deviation bar a perpendicular distance from said course bearing indicator proportional to the amplitude of said signal in a direction corresponding to the sign of said signal;
means for selectively altering said rotating means for said course bearing indicator to rotate said course bearing indicator relative to aircraft heading on said compass ring in accordance with said first signal;
means for selectively substituting said second signal for said angular deviation signal for displacing said lateral deviation bar a perpendicular distance from said course bearing indicator a distance proportional to the amplitude of said second signal in a direction corresponding to the sign of said second signal; and
switching means for simultaneously actuating said means for selectively altering said rotating means and said means for selectively substituting said second signal for said angular deviation signal.

3. In a display system as defined in claim 2, the combination including:
means for interrupting the projection of said chart image on said display surface; and
means for selectively actuating said interrupting means, whereby said course bearing indicator and said lateral deviation bar may be displayed for VOR navigation without display of a chart.

4. In a display system, the combination as defined in claim 3 wherein said flight path is a radial of a VOR station, and said receiver is a VOR receiver.

5. In a display system, the combination as defined in claim 4 wherein said navigation route calculated by said computer is a great circle route.

6. In a flight navigation system for an aircraft, said system having computing means for determining a navigation route as a desired flight path between any two specified way points on a chart, continually determining aircraft position and continually producing a route bearing signal proportional to a compass bearing of said route and a linear deviation signal proportional to the linear deviation of said computed aircraft position from said route along a line perpendicular to said route, said system also having means for continually receiving a VOR radial signal from a selected station and for producing an angular deviation signal proportional to angular deviation of actual aircraft position from a selected radial, the combination comprising:
a display unit including a display surface, the center of said surface representing the position of said aircraft;
means for displaying a compass ring centered on said surface and stabilized in azimuth as said aircraft changes heading;
means for displaying a course bearing indicator in alignment with said center and a given bearing on said ring, said given bearing being a function of a given flight path desired;
means for selecting a radial of a VOR station as a desired flight path;
means responsive to said selecting means for producing a radial bearing signal proportional to the compass bearing of said radial course selected;
means for displaying a lateral deviation bar on said surface at a distance from said center in response to a selected one of said linear and angular deviation signals; and
switching means for connecting to said course bearing indicator display means a selected one of said radial bearing and computed route bearing signals, and for simultaneously connecting to said lateral deviation bar display means a corresponding one of said angular and linear deviation signals.

7. The combination as defined in claim 6 including:
means for displaying only a portion of said chart, said portion being a small fraction of the total chart;
means for continually selecting said portion of said chart to include said aircraft position on said chart at said center of said display surface; and
means for continually stabilizing said chart display means in azimuth as said aircraft changes heading.

8. The combination as defined in claim 7 wherein said course bearing indicator is a discontinuous line display on said surface with an arrowhead at one end for pointing to a bearing on said compass ring, said line being a diameter of said ring with a center portion of said line omitted, and said lateral deviation bar is a line approximately equal in length to said center portion omitted from said first symbol line, said lateral deviation bar being disposed parallel to said course bearing indicator in said display unit, and both said course bearing indicator and said lateral deviation bar are superimposed on said portion of said chart displayed.

9. The combination as defined in claim 8 wherein said surface comprises an optical display surface, and said means for displaying only a portion of said chart, and said means for superimposing said course bearing indicator and said lateral deviation bar on said portion, comprise:
optical means for projecting an image of said chart portion onto said surface;
optical means for projecting an image of said course bearing indicator and lateral deviation bar properly spaced onto said surface; and
means for selectively interrupting the projection of an image of said chart portion.

10. In an aircraft horizontal situation display system for a navigation director system in which an azimuth stabilized image of a chart is optically projected onto a display surface within an azimuth stabilized compass ring for continual display of a portion of said chart image, with aircraft position on said chart image always centered on said display surface under control of a computer in a navigation director system, said navigation director system having two navigation systems for selecting a flight path, each navigation system producing a first signal proportional to course bearing of a selected flight path, and a second signal proportional to lateral deviation of aircraft position from said selected flight path, the combination in an aircraft comprising:
means for superimposing an image of a course bearing indicator on said chart portion projected onto said surface as a diameter of said compass ring with a center section omitted and an arrow to point to a desired course bearing on said compass ring;
means for superimposing a lateral deviation bar image on said chart portion projected onto said surface in a position parallel to and laterally in line with said omitted portion of said course bearing indicator, but displaced therefrom laterally a distance said aircraft position is off said desired flight path;
means for controlling said distance as a function of a second signal from a selected one of said two navigation systems;
means for controlling the bearing on said compass card to which said course bearing indicator points as a function of a first signal from a selected one of said two navigation systems; and
means for selecting one of said two navigation systems for display of course bearing and deviation of aircraft position from a desired flight path.

11. The combination as defined in claim 10 wherein:
one of said two navigation systems is for navigating a flight path along a selected line established by radio transmission of a signal from a ground station to said aircraft, and deviation from said radio established flight path is an angular value, the magnitude of which is proportional to lateral displacement of said lateral deviation bar from said course bearing indicator; and the other of said two navigation systems is for navigating a flight path between two designated points on a chart along a predetermined line calculated by a computer of a navigation director system, and deviation from said computer calculated flight path is a linear value the magnitude of which is proportional to lateral displacement of said lateral deviation bar from said course bearing indicator.

12. The combination as defined in claim 11 including means for selectively interrupting the optical display of said chart while selecting for display said one system for navigating a flight path along a selected line established by radio transmission of a signal from a ground station.

13. In an aircraft navigation system of the type including an optical display surface within an azimuth stabilized compass ring, said surface having a center which represents the position of an aircraft, said system having means for displaying a portion of an azimuth stabilized chart on said surface with the position of said aircraft on said chart at said center of said display, said system being operable in an area navigation flight made in which a course bearing indicator is superimposed on said chart portion displayed at an angle with a diameter passing through a mark on said compass ring representing aircraft heading, said angle being equal to the difference between the bearing of an established route and the heading of said aircraft in response to a signal $\phi$ proportional thereto from a computer which establishes said route, and a lateral deviation bar is superimposed on said chart portion displayed at a distance from said center which corresponds to the off-route error of said aircraft, and in parallel with said course bearing indicator, in response to a signal $\rho$ proportional thereto from said computer which establishes said route, the improvement comprising:

means responsive to said signal $\phi$ for rotating said course bearing indicator about said display center, whereby its angular position with respect to said diameter passing through aircraft heading represents only the course bearing of said route on said chart;

means for selectively modifying said system for operation in a radio station radial flight made in which an azimuth stabilized course bearing indicator is displayed to show on said compass ring the bearing of a selected radial line from a radio station; and means responsive to said selectively modifying means for substituting a signal $\rho'$ for said signal $\rho$, where $\rho'$ is a signal produced by radio receiving means for radial flight navigation, said signal $\rho'$ being proportional to angular deviation of aircraft position from said selected radial line.

14. The improvement in an aircraft navigation system as defined by claim 13 wherein said means for selectively modifying said system for operation in a radio station radial flight made comprises means for substituting a signal $\phi'$ for said signal $\phi$, and said signal $\phi'$ is produced by a differential transformer selectively connected in series between an input selsyn and an output selsyn of a selsyn repeating system, said selsyns having stator coils coupled to each other by said differential transformer, means coupling a rotor coil of said input transformer to said azimuth stabilized azimuth ring for rotation as aircraft heading changes, and a radial course selecting means coupled to said differential transformer for rotating the primary thereof relative to the secondary thereof through an angle from a reference position, said angle corresponding to the radial selected, whereby one rotor coil of said output selsyn produces a signal for stabilizing said course bearing indicator during a radial flight navigation made at a selected radial bearing as said aircraft changes heading.

15. The improvement in an aircraft navigation system as defined by claim 14 wherein said means for selectively modifying said system for operation in a radio station radial flight made comprises a first group of switches which, when a radial flight made is not selected, connect corresponding stator coils of said input and output selsyns directly, connect two orthogonal rotor coils of said output selsyn to said computer for calculation of said signal $\phi$ from aircraft heading data produced by said orthogonal stator coils, and to apply said signal $\phi$ from said computer in place of said signal $\phi'$ from said one rotor coil of said output selsyn.

* * * * *